United States Patent [19]

Simon et al.

[11] 4,225,953

[45] Sep. 30, 1980

[54] PERSONNEL LOCATOR

[76] Inventors: William F. Simon, 235 W. Fairbault, Duluth, Minn. 55803; William C. Torrey, 801 Seventh Ave., E., Superior, Wis. 54880; Chris W. Hull, 1096 85th Ave., W., Duluth, Minn. 55808

[21] Appl. No.: 947,112

[22] Filed: Sep. 29, 1978

[51] Int. Cl.[2] ........................ H04B 11/00; G08B 5/00

[52] U.S. Cl. .................................... 367/117; 340/312; 367/910

[58] Field of Search ..................... 340/3 C, 16 R, 150, 340/183, 311, 312; 179/15 AL; 367/118, 117, 191, 910

[56] References Cited

U.S. PATENT DOCUMENTS

| | | | |
|---|---|---|---|
| 3,439,320 | 4/1969 | Ward | 367/117 X |
| 3,478,344 | 11/1969 | Schwitzgebel et al. | 340/312 |
| 3,696,384 | 10/1972 | Lester | 340/312 |
| 3,739,329 | 6/1973 | Lester | 367/6 |
| 4,052,567 | 10/1977 | Mackay | 179/15 AL |

*Primary Examiner*—Richard A. Farley

*Attorney, Agent, or Firm*—Merchant, Gould, Smith, Edell, Welter & Schmidt

[57] ABSTRACT

A personnel locator and display system for indicating on a status board the room numbers where designated key individuals are located at a given moment. Small portable transmitters, either ultrasonic or radio frequency, are worn by the key individuals, and receivers are provided in the rooms. The various transmitters emit pulses according to a preprogrammed timing sequence, and a decoding logic network connected to receive signals received in the rooms identifies the specific transmitter and room number and displays same on a status board. A programmer-recharger unit programs the pulse timing for each transmitter for identification of the wearer.

12 Claims, 6 Drawing Figures

FIG. 3
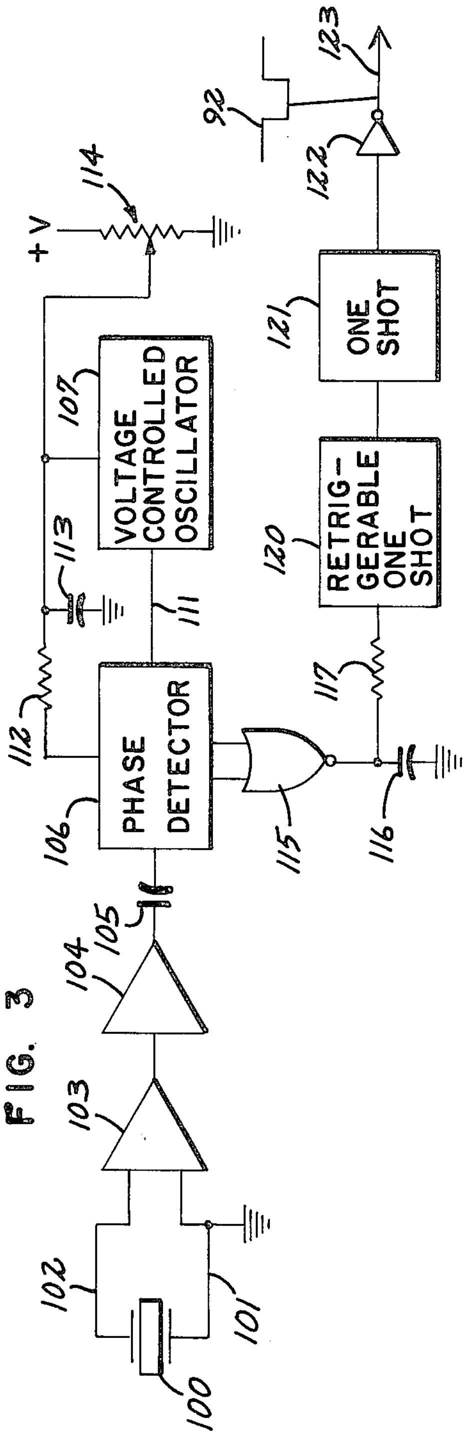
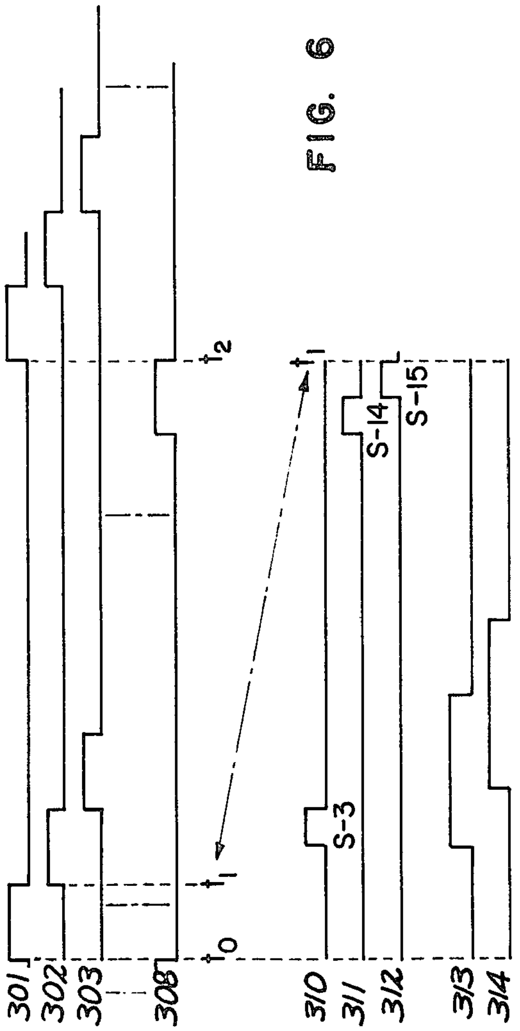
FIG. 6

PERSONNEL LOCATOR

BACKGROUND OF THE INVENTION

The present invention pertains to the field of personnel locating systems. Systems of this general type have been proposed in the prior art for use in buildings where it is necessary to keep track of the movements of certain key personnel from one room or area to another. One example is in a hospital or clinic, where doctors move from one room to another, and there is a need to know the location of each doctor at all times in case they are needed in emergencies. Personnel locator systems are useful in other situations also, so that key or supervisory people in an office, school, plant or the like can be located on short notice.

Personnel locator systems generally comprise small electronic transmitters or transceivers to be worn by the individuals, and a network of receivers or transceivers installed in various rooms or areas to be visited by the personnel. Signals are generally sent to a central location and processed so that the location of the individual transmitters can be displayed or indicated.

While prior art locating systems have achieved their basic objective of tracking movements of the personnel, prior art systems have suffered disadvantages of complexity and high cost, factors which have been serious obstacles to adoption of such systems in places where they would otherwise be useful. One type of prior art personnel locator makes use of ultrasonic transmitters to be worn by key personnel, with each transmitter operating on a different carrier frequency. This requires that each room has multiple receivers, one for each frequency, or in the alternative complex receivers tuned to multiple frequencies. Since a different frequency is required for each person to be monitored, it is very evident that as the number of key personnel to be monitored increases, the cost of the total system increases at a disproportionately high rate, since an additional receiver for each additional frequency must be provided in each room. This type of prior art system is shown in U.S. Pat. No. 3,439,320 to Ward.

Another prior art system is shown in U.S. Pat. No. 3,696,384 to Lester. In this ultrasonic system coded pulses are transmitted in all rooms, and the portable unit having the particular code will respond by transmitting a reply signal which is picked up and used for displaying the location of the particular unit. Although this system requires only a single transmission frequency, it requires both transmitters and receivers or transceivers, in each room and for each portable unit. U.S. Pat. No. 3,739,329 to Lester uses a combination of ultrasonic and radio frequency transmission with particular frequencies or codes for the portable units, but the system also requires transceivers at the portable units, the central console, and a plurality of remote stations.

In addition to the complexity and cost represented by the multiple receivers or transmitter-receivers in the prior art systems as discussed above, such systems may be subject to a possible further disadvantage in that erroneous locations will be displayed if one or more of the key personnel inadvertently carry the wrong portable unit. This could happen, for example, if the portable units are all checked into a central area for battery recharging at the end of the day, and checked out again for use in the morning. Since each portable unit is wired or electronically adjusted for a discrete code or frequency, a person who inadvertently takes the wrong unit will be transmitting erroneous signals as to someone else's location. Of course it is not possible to eliminate entirely the possibility of such inadvertent errors by system design, but one aspect of the present invention provides a technique for minimizing the possibility of such errors.

SUMMARY OF THE INVENTION

The present invention provides a personnel locating system including a plurality of portable transmitter units, one for each of the key personnel whose location is to be monitored, and a plurality of receiver units, one installed in each of the rooms or areas to be monitored. All transmitter and receiver units may be adapted for ultrasonic, or alternatively, for radio frequency transmission, and all units may operate on the same frequency. Identification of individual transmitter units is achieved by a pulse timing technique whereby discrete time slots are assigned for pulsing by individual units on a recurring basis. Pulses received in the rooms are transmitted to decoder logic which identifies the locations of the various transmitter units in accordance with the time interval in which pulses are received in various rooms. A status board or other display device then displays the room number or other designation of the location for the key personnel.

According to another aspect of the invention, programming means are provided for the portable units. According to this aspect of the invention, all portable transmitter units can be identical in construction and electronic adjustment, and transmitters for individual personnel are programmed to predetermined pulse timing slots by the programming means. Any person can then use any portable transmitter, providing only that it is momentarily plugged into a receptacle on the programmer identified by the name of the individual. In this manner the possibility of "mistaken identity" because of wearing the wrong portable unit is minimized. In the preferred embodiment, the programmer is combined with a recharger so that the portable units are automatically programmed for the right person as they are recharged overnight.

BRIEF DESCRIPTION OF THE DRAWINGS

In the drawing,

FIG. 3 is a schematic diagram of a receiver for installation in a room according to the preferred embodiment of the invention;

FIG. 6 is a graph showing pertinent timing waveforms for the operation of the preferred embodiment.

DETAILED DESCRIPTION OF THE DRAWINGS

Figure 1:
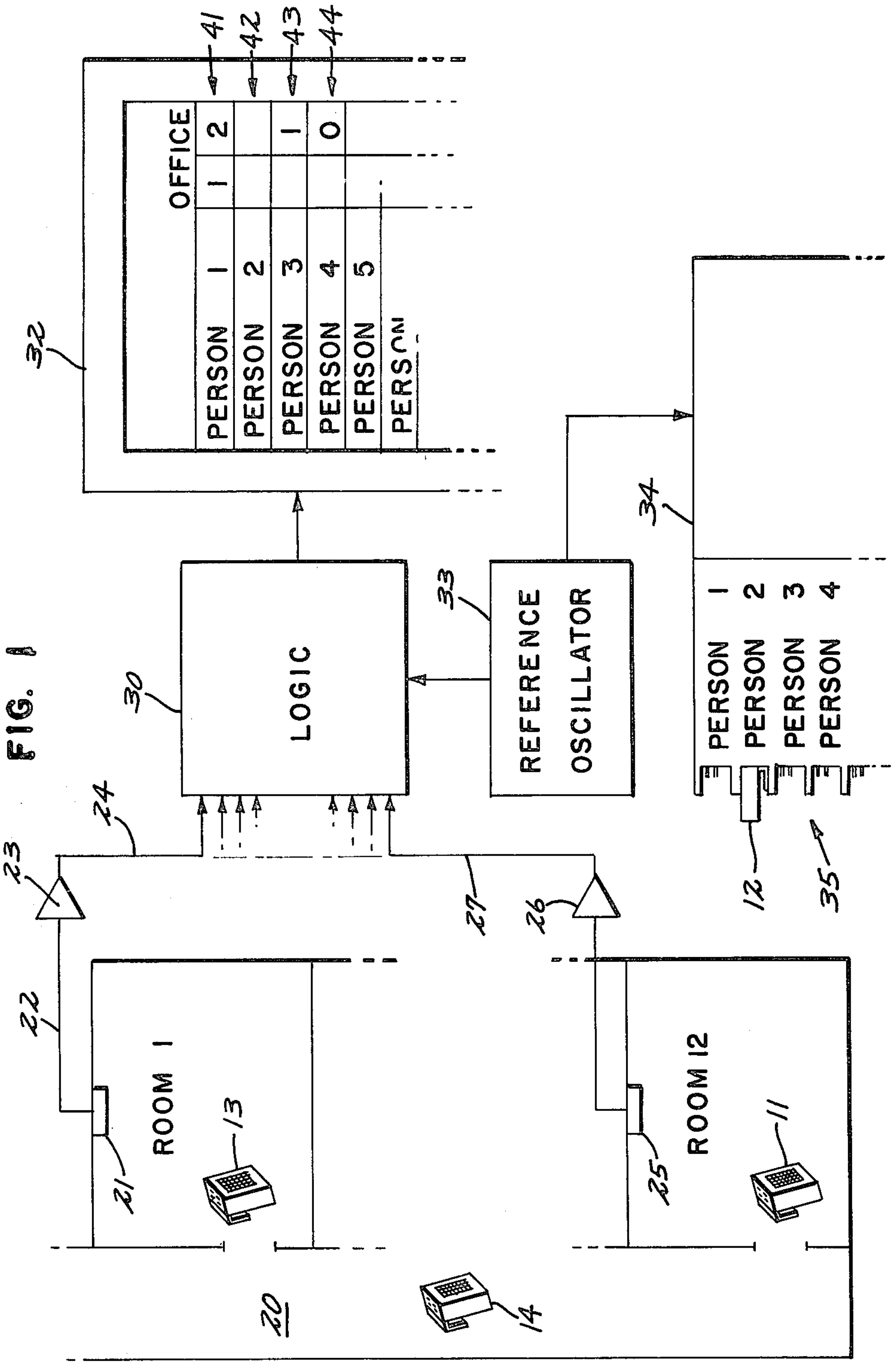
FIG. 1 is a simplified schematic representation of the overall personnel locator system according to the present invention.

Referring now to FIG. 1, the overall configuration and operation of the personnel locator system according to the preferred embodiment will be explained. Reference Nos. 11, 12, 13 and 14 designate the portable transmitter units which are adopted to be worn or carried by the key personnel whose locations are to be monitored. The portable transmitters are preferably in small packages, roughly the size of a cigarette package or a hand-held calculator, and are equipped with a clip or other fastner for attachment to the belt, pocket, lapel, or other portion of the person's clothes. The transmitter units are also equipped with plug sockets for plugging into the recharger-programmer as will be explained more fully hereinafter.

The left-hand portion of FIG. 1 is a diagrammatic representation of a portion of a building, with rooms 1 and 12 indicated. It will be understood of course that a great number of rooms would typically be involved, each with its own designation. Reference Number 20 designates a hallway area of the building.

With reference to room 1, ultrasonic detector 21 is mounted somewhere in the room, preferably in the ceiling or high on a wall. Sensor 21 connects by lead 22 to a amplifier and detector designated by reference number 23, and from there by lead 24 to a decoder logic unit 30. In similar manner, room 12 has an ultrasonic sensor 25, amplifier-detector unit 26 and connecting lead 27 which leads to logic unit 30. The remaining room (not shown) has similar sensors and detectors which supply inputs to logic unit 30. It will be understood that in the case of a radio frequency transmission embodiment of the invention, instead of the ultrasonic embodiment shown, suitable small RF antennas and receivers would be provided instead of the ultrasonic sensors.

Decoder logic unit 30 connects to a display board 32, which would typically be located at a receptionist station or at such other central location where information on the location of key personnel is needed. Status board 32 includes a column of names of the key personnel, represented in FIG. 1 by the designation "person 1, person 2, etc." It will be appreciated that although space for only five names is shown in FIG. 1 for purposes of clarity of illustration, in practice the display board would be as large as required for any desired number of persons, according to the design of a particular system.

Adjacent the space for the name of each person is a display indicated by reference numbers 41 through 44 in FIG. 1. Two digits of display are provided for each person, for accommodating up to ninety-nine rooms. The displays themselves may be any type of numerical digital display such as LED, liquid crystal, or the like as is generally known in the prior art.

Programmer-recharger unit 34 performs a dual role in the preferred embodiment of recharging the batteries of the portable transmitter units, and programming them. In the preferred embodiment all portable transmitter units are electronically identical, and it is the programming of individual units by programmer-recharger 34 that keys a particular unit to a particular numerical display on display board 32, as will be explained more fully hereinafter.

Reference number 33 indicates the system master reference oscillator which provides timing signals for the decoder logic and also for the programming of the portable transmitters. Oscillator 33 connects to logic 30, and also to programmer-recharger 34. Towards the left of unit 34 in FIG. 1, reference number 35 designates a plurality of plug-in sockets, adapted to receive the portable transmitter units. A separate plug-in socket is provided for each transmitter unit, according to the number of units in the particular system, and each socket is identified with the name of a person as on display board 32.

In FIG. 1 for illustrative purposes, transmitter unit 11 which corresponds to person number 1 is positioned in room 12. Its signals are picked up and decoded by logic unit 30 so that "12" is displayed adjacent "person 1" at display 41. Unit 12 for person number 2 is plugged into programmer-recharger 34, and this causes both digits to display a blank on display 42, as will be explained hereinafter, to indicate that person number 2 is not on the premises. Transmitter unit 13, for person number 3 is in room 1, and "1" is shown in display 43. Finally in FIG. 1, transmitter unit 14 for person number 4 is in hallway 20 and since this unit is neither in a room nor in the recharger, the designation "0" is displayed in display 44 to indicate that person number 4 is in the building but not in a monitored room. As the monitored persons move from to room to room, the displays 41, 44 are continually updated to show their locations.

The preferred embodiment of the invention shown in the circuit diagram of FIGS. 2 through 5 is an ultrasonic embodiment of the present invention, with the timing circuits designed for eight portable transmitter units. However, the invention is not limited to ultrasonic transmission nor any particular number of transmitter units, and adaptation to radio frequency transmission and different numbers of transmitter units will be apparent to those skilled in the art based upon the following description of the preferred embodiment.

Figure 2:
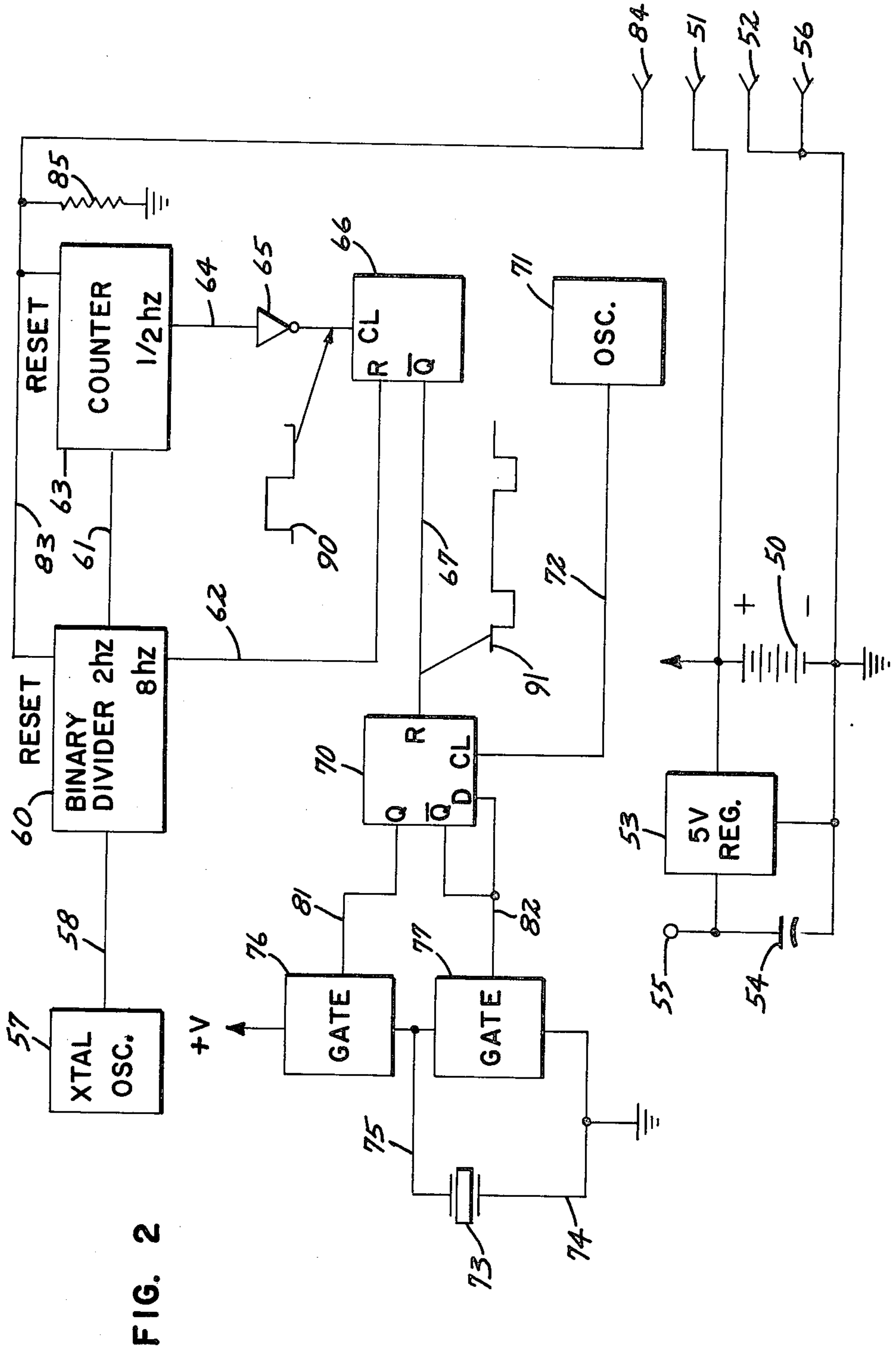
FIG. 2 is a block diagram of the circuitry for the portable transmitter unit for the preferred embodiment of the invention.

A portable transmitter unit is shown in FIG. 2. It includes a rechargeable battery 50, which connects to a pair of plug receptacles 51 and 52, which are part of the plug terminals for connecting to the programmer-recharger unit. A five volt voltage regulator 53 is connected to the battery, and its output connects to a terminal 55 and to a filtering capacitor 54. Terminal 55 is connected to the other circuits of FIG. 2 for energization thereof, but these power connections are omitted for purpose of clarity. The negative terminal of battery 50 is the circuit ground for the transmitter unit, and connects to receptacle 52, and also to receptacle 56.

A crystal reference oscillator 57 is provided, and in the preferred embodiment oscillates at a frequency of 32,768 hz. The output of oscillator 57 connects by lead 58 to a binary divider circuit 60. Divider 60 counts down the oscillator frequency and provides two outputs: a 2 hz at lead 61 and an 8 hz at lead 62. A further counter 63 is provided to receive lead 61 and provide an output at lead 64 of $\frac{1}{2}$ hz. Lead 64 connects to an inverter 65, whose output connects to the clock input of a flip flop circuit 66. The 8 hz signal on lead 62 connects to the reset input of flip flop 66. The $\overline{Q}$ output of flip flop 66 connects via lead 67 to the reset input of another flip flop 70.

Another oscillator 71 is provided which has a frequency of 80.4 khz which is twice the carrier frequency. This frequency is supplied via lead 72 to the clock input of flip flop 70.

The ultrasonic transmitting crystal is indicated by reference number 73. In the preferred embodiment this crystal is selected for a frequency of approximately 40 khz. One terminal of the crystal connects to signal ground by lead 74, and the other terminal connects by lead 75 to a pair of transmission gate switches 76 and 77. The other side of switch 76 connects to the battery supply voltage plus v, and the other side of switch 77 is connected to signal ground. Switches 76 and 77 are toggeled alternately by the Q and $\overline{Q}$ outputs of flip flop 70 as it responds to the pulses at its clock input. A branch of lead 82 connects to the D input of flip flop 70.

A reset line 83 for divider-counters 60 and 63 is provided, and this lead connects to terminal 84 of the connector socket. A load resistor 85 connects from a reset line to signal ground. The reset line is used for programming.

In operation, the frequencies at leads 61 and 62 derived from the output of oscillator 57 are used to provide a gating signal for transmission of the ultrasonic carrier. Specifically, a signal as identified by waveform 90 is provided at the input to flip flop 66, having a period of two seconds. The 8 hz signal at lead 62 is used to reset flip flop 66 following setting thereof by waveform 90 at the start of each two second period. The resetting of the flip flop by the 8 hz signal on lead 62 provides a gating signal of approximately 63 msec at a two-second repetition rate, as indicated by waveform 91.

During the 63 msec period flip flop 70 is enabled and the 80.4 khz signal at lead 72 causes flip flop 70 to continuously toggle for the duration of the 63 msec period. Toggling of the flip flop cause alternate actuation of transmission gate switches 76 and 77 to alternately connect lead 75 to ground and to the plus v battery voltage. The result is to cause transmission crystal 73 to emit a 40.2 khz burst of energy lasting approximately 63 msec, with the bursts being repeated at two-second intervals. The purpose of reset line 83 is to program the transmitter unit as will be explained further with reference to the other figures.

FIG. 3 shows a receiver for installation in a room. Reference number 100 indicates the ultrasonic receiving crystal. Crystal 100 connects to signal ground lead 101, and connects by lead 102 to a preamplifier 103. Preamplifier 103 is preferably of a high input impedance design employing field effect transitors, as is generally known in the art. Preamplifier 103 connects to a further signal amplifier 104 and the output of this amplifier connects to a coupling capacitor 105 to the signal detection circuitry. In the preferred embodiment signal detection is performed by a phase locked loop, which includes phase detector 106 and voltage controlled oscillator 107. These components are interconnected by lead 111 and resistor 112 as is generally known and a capacitor 113 and potentiometer 114 are provided for adjusting the lock frequency of the loop. Pulse outputs of detector 106 are applied to a NOR gate.

The output NOR 115 connects via capacitor 116 to signal ground and via resistor 117 to the input of a retriggerable one shot 120 and the output of this circuit connects to the input of one shot 121. The output of this circuit connects through inverter 122 to lead 123.

In operation, the receiver and detector circuitry function to provide an output waveform 92 on lead 123 in response to the receipt of the transmitted burst from a transmitter unit. For purposes of noise rejection, crystal 100 is selected for resonance at 41.5 khz, while the frequency transmitted by the portable units is slightly different, at 40.2 khz. The lock frequency for the phase locked loop is adjusted for 40 khz plus or minus 500 hz. Acoustic noises occurring in the room may excite the resonant frequency of crystal 100, but since this frequency is outside the lock frequency these signals will be rejected. However, the ultrasonic carrier frequency signals will excite crystal 100 to provide a workable signal which is amplified in amplifiers 103 and 104 and delivered to the phase detector. When no signal or a signal outside the lock range is received by the phase detector, a series of pulses are provided to gate 115 which causes continuous retriggering of one shot 120. When a carrier frequency is received the output of gate 115 goes to ground, and if this condition persists for the 10 msec period of one shot 120, it will time out and energize one shot 121 which provides, through inverter 122, the output waveform 92 having a duration of approximately 80 msec. The use of two one shots effectively filters out extra pulses that might pass from detector 106 through gate 115 to one shot 120 due to momentary loss of detection of the carrier signal during a transmission burst. This can occur, for example, due to poor acoustic coupling within the room, or due to reflections or cancellation within the room. The effects can obviously vary as the person moves in the room.

Figure 4:
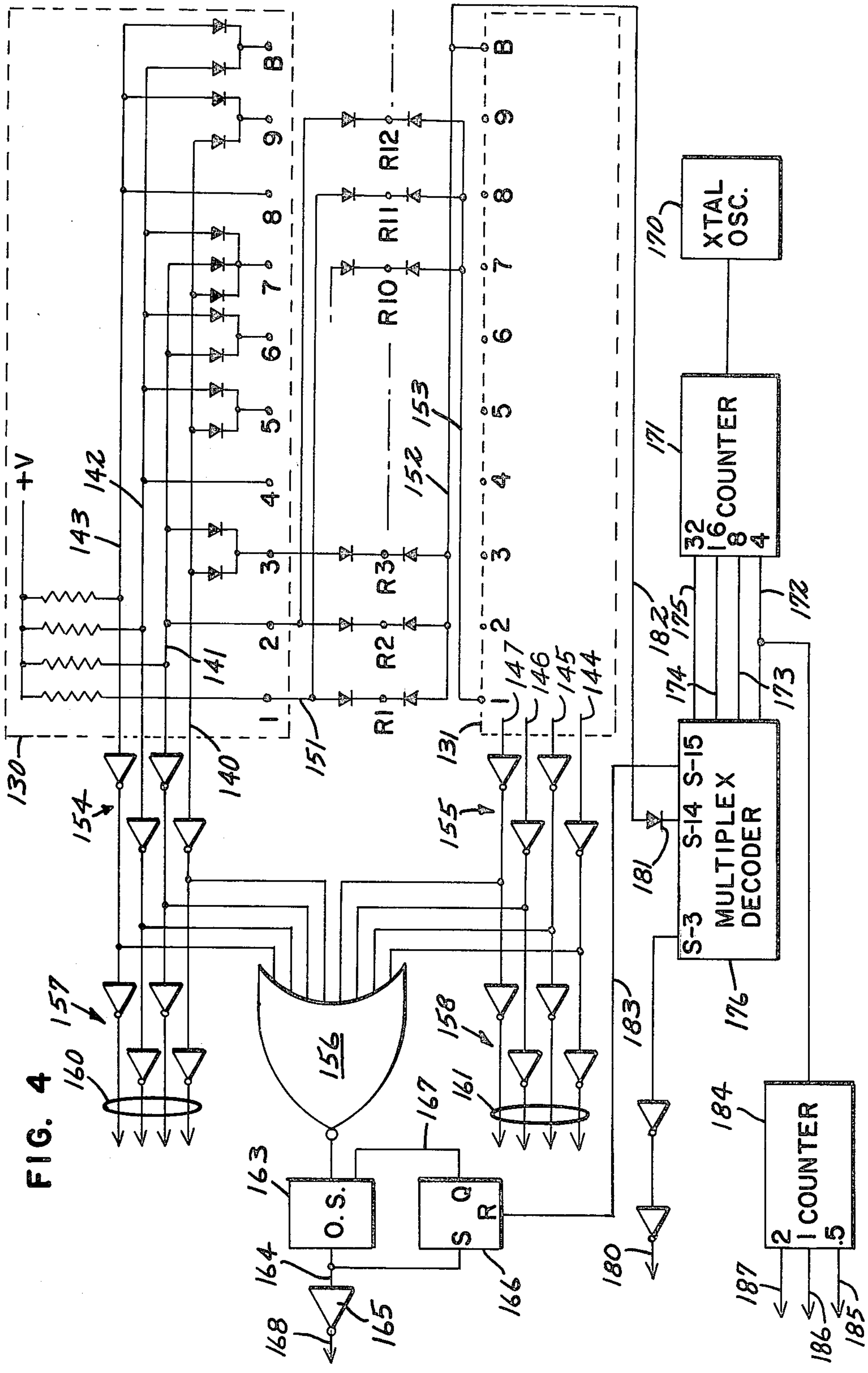
FIGS. 4 and 5 are schematic diagrams of the decoder logic, display and programming circuits of the system of FIG. 1.

The various leads 123 from the various room receivers are connected by cable to the decoding circuits of FIG. 4. The room inputs are designated R1, R2, R3 . . . R10, R11, R12 . . . , it being understood that the number of room inputs would correspond to the number of room receiver units. Specifically, lead 123 of FIG. 3 for the receiver in room 1 would connect to input R1 of FIG. 4. Similarly, lead 123 from the receiver in room 10 would connect to the R10 input, and so on. Only a few of the inputs have been shown for clarity of illustration.

A pair of identical diode arrays 130 and 131 are provided. These arrays are standard decimal to binary coded decimal converters and only the details of array 130 are shown. Leads 140 through 143 are the BCD outputs representing the least significant digit of the room number. Specifically, lead 140 is the one bit, lead 141 is the two bit, lead 142 is the four bit, and lead 143 is the 8 bit. Inputs 1 through 9 and B connect to leads 140–143 through connection wires and isolation diodes as required to perform the decimal to BCD conversion, with the B input (for blank) connecting to the 4 and 8 bits, which are unused for decimal conversion.

The room inputs are connected to the decimal inputs of the least significant bit converter 130 and the most significant 131 by a plurality of jumper leads as indicated in FIG. 4. Input R1 connects through isolation diodes to the 1 input of circuit 130 via lead 151, and to the B input of circuit 131 via lead 152. Inputs R2 and R3 similarly connect to the 2 and 3 inputs, respectively of circuit 130 and to the B input of circuit 131. Room inputs R10, R11 and R12 all connect via lead 153 to the 1 input of circuit 131, and in addition, input R11 connects to the 1 input of circuit 130 while room input R12 connects to the 2 input circuit 130. The pattern is repeated until each room number input is connected to the appropriate decimal inputs of the least and most significant bits.

The least significant bit data lines 140–143 and the most significant bit data lines 144–147 connect respectively through a plurality of inverters 154 and 155 to a plurality of inputs of NOR gate 156. The data lines also connect through a further set of inverters 157 and 158, respectively, to leads 160 which represent in BCD form the least significant digit of the room number, and to leads 161 which represent in BCD form the most significant digit.

The output of NOR 156 connects to the input of one shot 163, the output of which connects via lead 164 to an inverter 165 and the set input of flip flop 166. Lead 164 also connects through an inverter to lead 168. The Q output of flip flop 166 connects via lead 167 to a disabling or inhibiting input of one shot 163.

The master crystal oscillator 170 is selected for the same frequency as oscillators 57 in each of the portable transmitter units. The output of oscillator 170 is applied to the input of a counter-divider 171. Counter 171 has a plurality of outputs; the output on lead 172 is a 4 hz signal; the output on lead 173 is 8 hz; the output on lead 174 is 16 hz; and the output on lead 175 is a 32 hz signal. These four signals are used as a four bit binary input to multiplex decoder 176, causing it to sequentially energize its sixteen output states 0 through 15 in response to the inputs being applied thereto by leads 172–175. Only three of the output states of decoder 176 are used. The state three output connects via a pair of inverters to lead 180. The state fourteen output connects through diode 181 and lead 182 to the B input of circuit 131. The state fifteen output connects through lead 183 to the reset input of flip flop 166.

A branch of lead 172 applies the 4 hz signal from counter 171 to another counter 184. This counter further divides the signal to provide a 2 hz output at lead 187, a 1 hz output at lead 186, and a 0.5 hz output at lead 185.

Figure 5:
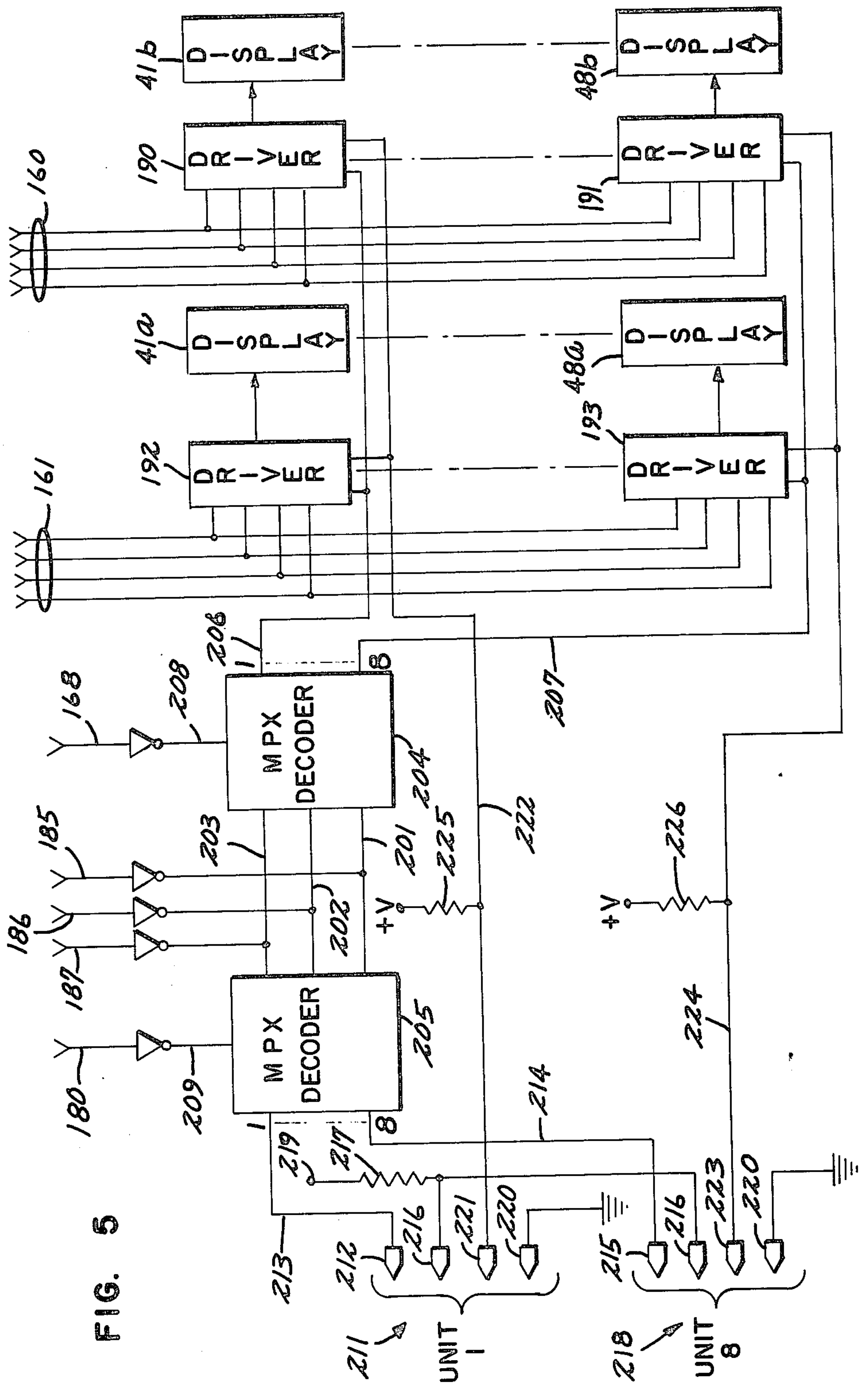

Referring now to FIG. 5, reference numbers **41*a* and 41*b* are the digital displays for the most and least significant digits of the room number for the first person on display 32 of FIG. 1. Similarly, reference numbers 48*a* and 48*b* designate the most and least significant digits of the room number corresponding to the eighth person for the system. Corresponding displays for the other person have been omitted from FIG. 5 for purposes of clarity. Data lines 160 from FIG. 4 carrying the BCD information for the least significant bit connect to latch-decoder-driver circuits 190 and 191, together with similar circuits for the display of all other persons, omitted from FIG. 5. Circuits 190 and 191, when enabled, cause their associated displays 41*b*, 48*b* to display a decimal number corresponding to the BCD number existing on leads 160 at the time the latch is enabled. Latch-decoder-driver circuits 192 and 193 receive the most significant digit data from leads 161 and are connected for driving displays 41*a* and 48*a*** respectively.

Leads 185–187 from FIG. 4 connect through inverters to leads 201, 202 and 203 which are applied as inputs to a pair of multiplex decoders 204 and 205. The enabling pulse for decoder 204 is applied from lead 168 through an inverter to lead 208, and the enabling pulse for decoder 205 is applied from lead 180 through an inverter to lead 209. Each of these decoders, when enabled, selectively enables one of eight output states in accordance with the three bit binary number applied as an input on leads 201–203. Decoder 204 serves to enable displays for different persons. The output from the first state connects via lead 206 to the enable input of latch-decoder-driver circuits 192 and 190 for the first person on the display, while lead 207 connects from the eighth output to enable circuits 193 and 191 for the eighth person display.

Decoder 205 similarly enables one of its outputs 1 through 8 in accordance with the input signal. These output signals are applied to terminals for plugging in the portable transmitter units. Reference number 211 generally designates the four-pin plug which is part of the programmer-recharger unit for receiving the first portable transmitter units. The pins of connector 211 mate with connectors 84, 51, 52 and 56 from FIG. 2. Similarly, reference number 218 generally designates the connectors for receiving the eighth transmitter on the programmer-recharger unit. Pin 212 of connector 211 connects via lead 213 to the first output of multiplex decoder 205. The eighth output of decoder 205 connects via lead 214 to pin 215 for the eighth unit. Similar connection would be provided for the other outputs of decoder 205, to the corresponding pin for the plug-in for the other units. Pins 216 of the connectors connect through a current limiting resistor 217 to the battery recharging power supply indicated by reference number 219. Pins 220 of the connectors for all units are connected to signal ground.

Pin 221 connects through lead 222 to drivers 190 and 192 for the first person display. Similarly, connector pin 223 for the eighth unit connects through lead 224 to drivers 191 and 193 for the eighth unit. Both leads connect through load resistors 225 and 226 to a bias voltage supply.

Leads 222 and 224 represent a hard wired override to their respective displays to cause the displays to blank out when a transmitter unit is plugged into the corresponding receptacle. In the absence of a plug in, the bias voltage will be applied to lead 222 and the display will operate in accordance with data and enabling signals applied thereto. However, when a transmitter unit is plugged into the receptacle for unit 1, connector pins 220 and 221 are shorted together to ground because of the interconnection between connectors 52 and 56 of the transmitter. This places a ground on line 222, thus inhibiting the drivers and blanking the display.

The operation of this system will now be explained with the aid of the waveforms in FIG. 6.

The signals on leads 185–187, when applied to decoders 204 and 205 define 8 sequential time periods, one for each of the 8 transmitter units in the preferred embodiment of the invention. Specifically, waveforms 301–308 of FIG. 6 represent the potential output states 1 through 8, respectively of both decoders 204 and 205, in response to the input signals thereto from leads 185–187. Of course it is necessary for enabling signals to be applied to leads 168 and 180 before these outputs would actually be produced. In FIG. 6, the time period from $t_0$ to $t_2$ is the 2 second time period used in the preferred embodiment, and the time period from $t_0$ to $t_1$ is approximately 250 msec. Waveform 301, corresponding to transmitter unit number 1, has a 250 msec pulse beginning at time $t_0$, and repeated two seconds later. Waveform 302, for transmitter number 2 has identical pulses, except that they are displaced 250 msec so as to begin at the conclusion of the pulses in waveform 301. In similar manner the pulses for units 3 through 8 as shown by waveforms 303 and 308 are staggered to follow the preceding unit in sequential fashion.

Waveforms 310 through 314 of FIG. 6 are on an expanded horizontal scale from time $t_0$ to $t_1$. Waveform 310 shows the timing of the pulse S-3 from the state 3 output of decoder 176. Similarly, waveforms 311 and 312 show the output pulses S-14 and S-15 respectively from the state 14 and state 15 outputs of decoder 176. Each of these pulses has a duration of approximately 16 msec, and is repeated with each 250 msec pulse of waveforms 301–308.

Waveform 313 shows the timing of the transmitted burst for transmitter unit number 1, and waveform 314 shows the received pulse (corresponding to waveform 92 of FIG. 3) for that unit. Waveform 313 is synchronized to begin with pulse S-3 for the particular unit, and extends for approximately 63 msec as previously explained. Waveform 314 may occur at a variable delay following waveform 313, due to variations in the acoustic path length in a room from transmitter to receiver.

Individual transmitter units are programmed or synchronized into the appropriate time slots as follows. During the time interval $t_0$ to $t_1$, which is by definition assigned to transmitter number 1, output number 1 on lead 213 is ready to be enabled by the inputs 201–203. However, the enabling pulse at 180 does not occur exactly at $t_0$, but is delayed for approximately 60 milliseconds until pulse S-3 of waveform 310. At that time lead 180 is enabled and pulse S-3 is gated through decoder 205 to lead 213. Referring now to FIG. 2, this pulse will be received on reset line 83 and will reset divider 60 and counter 63. This has the effect of synchronizing the gating signals produced by flip flop 66 so that the transmission burst for that transmitter will be produced within the pulse for waveform 301. However, the transmission burst will not coincide with the beginning of the pulse in waveform 301, but is intentionally displaced according to the timing of pulse S-3. This serves to provide a guard band or safety factor so that in case of drift the pulse will not occur prematurely in the tail end of the preceding unit's time period. In similar manner, the remaining transmitter units are synchronized to produce their transmission burst within the pulses of waveforms 302–308. It will therefore be apparent that any of the transmitter units can be programmed to any of persons 1 through 8 simply by plugging the unit into the plug receptacle of the programmer-recharger unit corresponding to the particular person. Within two seconds the unit will be synchronized for that person. The oscillators in the transmitter units and the master oscillator 170 must be close enough in frequency that drift throughout a day does not cause shifting of pulses out of their proper time slots. Upon recharging overnight, the timing is reestablished for the following day.

For display purposes, the outputs of decoder 204 are enabled during the time periods defined by waveforms 301–308, respectively. However, no output signals are actually provided until an enabling pulse is received at input 208 from lead 168. To illustrate display of the room number, assume that the pulse in waveform 301, for transmitter unit number 1 is in progress. If a pulse is received in any room during this time period, it is assumed that the pulse is from transmitter unit 1 since it has been programmed to transmit during this time interval. The pulse received from any of the rooms is applied through converter circuits 130 and 131 of FIG. 4 to provide on data lines 160 and 161 a digital indication of the room number in which the pulse was received. This also activates NOR gate 156 to energize one shot 163 which generates the enabling pulses for lead 168. At this point output number 1 on lead 206 in FIG. 5 will have been selected as previously explained, and the enabling pulse at lead 168 causes latch-decoder-driver circuits 190 and 192 to be enabled and to capture and display the room number appearing on data lines 160 and 161.

At the same time, flip flop 166 is set, disabling one shot 163 via lead 167, so that it will not respond to any further pulses during the time slots defined for unit number 1. At the end of that time slot, pulse S-15 in waveform 312 resets flip flop 166 to enable one shot 163 for a repetition of the above-described cycle, but for unit number 2.

If during the pulse 301 for unit number 1, no signal is received in any room, there would be no Room number signal to trigger one shot 163. If no signal has been received by the time pulse S-14 of waveform 311 occurs, this pulse is coupled to the B input of decoder 131, causing the code for blanking to appear on data lines 161. At the same time NOR gate 156 is enabled and one shot 163 transmits an enabling pulse to decoder 204. The most significant digit in display 41*a* is then blanked, while the least significant digit in display 41*b* displays a zero, indicating, as previously mentioned, that the transmitter unit number 1 is not plugged into the recharger, but that the person is not in one of the monitored rooms.

The above-described sequence is repeated during the pulse defined by waveform 302, so that the room number in which a pulse is received during this interval is displayed on the display board for person number 2. As previously mentioned, if a transmitter unit is plugged into a receptacle in the programmer-recharger, blanks will be displayed for both digits for that person.

It will thus be seen that the present invention provides a simple but effective personnel locating and display system, based upon defined sequential time slot transmissions of the portable transmitter units, with means for programming any of the transmitter units to correspond to a given person.

We claim:

1. A personnel locating system, comprising:

a plurality of transmitter units adapted to be worn or carried by personnel whose locations are to be determined, each of said transmitter units adapted for transmitting signals having a common frequency during separate predetermined time intervals on a recurring basis;

a plurality of receiving means for mounting in rooms or areas to be monitored for locating the personnel, each of said receiving means operative to receive the signals transmitted by any of said transmitter units;

decoder means including time reference means and operative in response to signals received by said receiving means during said predetermined time intervals to produce signals indicative of the location of said transmitter units; and display means connected to receive said location indicative signals and operative in response thereto to display the room or area locations of the personnel.

2. A system according to claim 1 wherein said transmitter units and receiving means are adapted for ultrasonic signal transmission and reception.

3. A system according to claim 1 wherein said transmitter units and receiving means are adapted for radio frequency signal transmission and reception.

4. A system according to claim 1 further including programming means operatively connected to said time reference means and selectively connectable to said transmitter units to program them for transmission during separate ones of said predetermined time intervals.

5. A personnel locating system, comprising:

a plurality of portable transmitter units for carrying or wearing by personnel to be monitored, each transmitter unit including a reference oscillator and gating means connected thereto to cause transmission of signals having a common frequency during recurring transmission intervals;

a plurality of receivers for mounting in individual rooms or areas to be monitored, each of said receivers operative to receive the signals transmitted by any of said portable transmitter units while in individual rooms or areas;

decoder means including a reference oscillator and means operatively connected thereto to define a plurality of sequential time intervals, and means responsive to said plurality of receivers to produce output signals indicative of the room or area and time interval in which a transmission is received;

programming means connected to said time interval defining means and selectively connectable to individual transmitter units to program them for transmission of signals during individual intervals of said plurality of sequential time intervals; and display means connected to receive said output signals and operative in response thereto to display the room or area location of the personnel.

6. A system according to claim 5 wherein said gating means of said transmitter units include pulse counting means and reset means therefor, and a connector for selectively connecting said programming means to said reset means.

7. A system according to claim 5 or claim 6 further including rechargeable batteries and recharging connectors in said transmitter units, and means associated with said programming means for connection to recharge said batteries simultaneously with connection to program said transmitter units.

8. A system according to claim 5 wherein said transmitter units and receivers are adapted for ultrasonic signal transmission and reception.

9. A system according to claim 5 wherein said transmitter units and receivers are adapted for radio frequency signal transmission and reception.

10. A system according to claim 1 or claim 5 wherein said decoder means is operative in response to the absence of signals received by said receiving means during said predetermined time intervals to produce signals indicative thereof, said display means providing a display indicating that the transmitter unit associated with said predetermined time interval is not in a monitored room or area.

11. A system according to claim 7 wherein said decoder means is operative in response to the absence of signals received by said receiving means during said predetermined time intervals to produce signals indicative thereof, said display means providing a display indicating that the transmitter unit associated with said predetermined time interval is not in a monitored room or area.

12. A system according to claim 11 further including means associated with said recharging means and operative when a transmitter unit is connected for recharging to cause said display means to indicate that the transmitter unit is being recharged.

* * * * *